United States Patent [19]

Matheson

[11] 4,101,014
[45] Jul. 18, 1978

[54] APPARATUS FOR REMOVING ICE AND SLEET FROM A THIRD RAIL OF AN ELECTRIFIED RAILWAY VEHICLE

[76] Inventor: Stuart C. Matheson, 1366 Broadway, Apt. 9H, Somerville, Mass. 02144

[21] Appl. No.: 831,866

[22] Filed: Sep. 9, 1977

[51] Int. Cl.² .............................................. B60L 5/02
[52] U.S. Cl. ................................ 191/62; 104/279; 15/55; 37/36
[58] Field of Search ............. 191/62; 104/279; 37/36, 37/37, 38, 39, 6, 14, 17, 19, 104, 105, 106; 15/54, 55, 368, 373

[56] References Cited

U.S. PATENT DOCUMENTS

| | | | |
|---|---|---|---|
| 793,924 | 7/1905 | Dresser | 104/279 |
| 1,017,208 | 2/1912 | Gardner | 104/279 |
| 2,929,084 | 3/1960 | Kershaw | 15/55 |
| 3,004,273 | 10/1961 | Rushmer | 104/279 |
| 3,517,787 | 6/1970 | Wessells | 191/62 |

Primary Examiner—Trygve M. Blix
Assistant Examiner—Reinhard J. Eisenzopf
Attorney, Agent, or Firm—Munroe H. Hamilton

[57] ABSTRACT

Electrically nonconductive rotary cleaner elements supported for movement into and out of contact with a third rail of an electrified railway vehicle includes sets of cleaner elements arranged in tandem along one side of an adjustable carriage. The carriage is mounted in a frame structure having a device for rigidly attaching the frame to a wheel truck portion of the railway vehicle. Power driving apparatus received in the carriage provide for vertical movements of the carriage in the frame as well as actuating the rotary cleaner elements. The drive apparatus is responsive to a control device located in the cab of the railway vehicle. A counterbalancing weight arrangement mounted in the frame and attached to upper sides of the carriage provides for uniformly guided travel of the carriage in all positions.

7 Claims, 5 Drawing Figures

APPARATUS FOR REMOVING ICE AND SLEET FROM A THIRD RAIL OF AN ELECTRIFIED RAILWAY VEHICLE

BACKGROUND OF THE INVENTION

In the art, various proposals have been made to deal with the problem of sleet and ice accumulating on the third rail of electrified railway apparatus. It is understood that various proposals have from time to time been made and patented and are capable of removing sleet or ice from third rails. However, devices disclosed in these patents are subject to difficulties such as excessive air or the occurrence of electrical arcing with fire outbreak. There is also difficulty arising out of high maintenance cost and short operating life. Included in these prior art patents which have been uncovered are U.S. Pat. Nos. 793,924; 870,591; 2,988,833; 3,004,273; 3,517,787 and 3,789,868. Of these patents, 3,517,787 is specifically concerned with third rail cleaner means and discloses a scraper apparatus designed to be dragged along a third rail and carry out a cleaning action.

SUMMARY OF THE INVENTION

The present invention is concerned with a cleaner apparatus for use in removing ice and sleet from the third rail of an electrified vehicle. It is a chief object of the invention to provide a cleaner apparatus which is effective and efficient in use and which can be readily attached to a wheel truck body of an electrified railway vehicle or at some other convenient part of the vehicle. Another object of the invention is to devise an adjustable cleaner apparatus made up of both cutter elements and scouring elements arranged in tandem and capable of being quickly moved into and out of contact with a third rail under the control of a cab operator. Still another object of the invention is to provide an assembly of parts which can furnish long operating life, which is of simplified construction and which includes replaceable components easily and quickly installed when desirable.

The foregoing objectives are achieved in the present invention by means of a rotary cleaner apparatus which includes a frame and a vertically adjustable carriage received in the frame. In the adjustable carriage, rotary cleaner elements are supported in a position to overlie a third rail of an electrified railway vehicle. Also contained in the carriage are power driving means for moving the carriage vertically in the frame together with power driving means for independently actuating the rotary cleaner elements. The dual power driving means is responsive to controls located in a cab of the railway vehicle. The power driving means for the carriage also actuates a counterbalancing weight arrangement which provides for uniformly guided vertical travel of the carriage into and out of operative positions.

DETAILED DESCRIPTION OF THE INVENTION

Referring more in detail to the drawings, 2 denotes a portion of an electrified railway vehicle at the underside of which is mounted a wheel truck body 4 in which is received wheels 6 and 8. These wheels are in rolling contact with a third rail 10.

Figure 1:
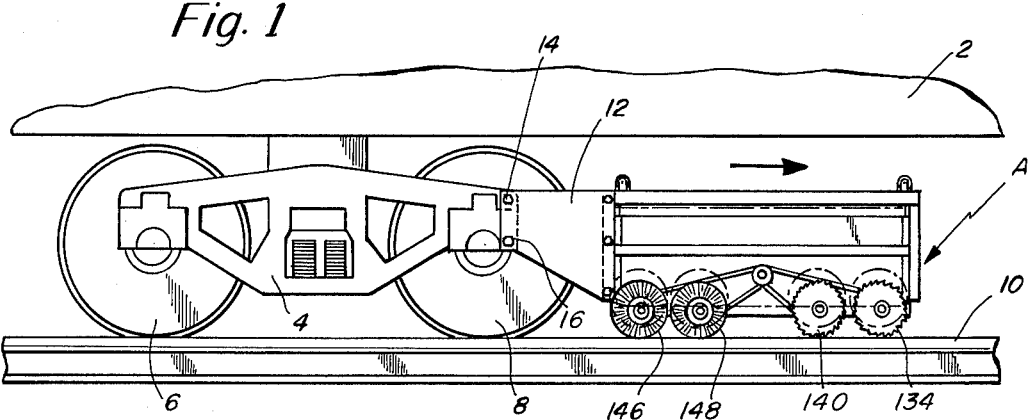
FIG. 1 is a side elevational view illustrating the cleaner apparatus of the invention attached to a wheel truck portion of an electrified railway vehicle shown fragmentarily.

In accordance with the invention, a cleaner apparatus generally denoted by the arrow A is attached to the wheel truck body 4 by suitable support means such as, for example, the bracket structure 12. The bracket structure is secured in some convenient manner as by bolts 14, 16, to the wheel truck body 4 and extends forwardly and downwardly to solidly support one end of the cleaner apparatus A as shown in FIG. 1.

Included in the cleaner apparatus in a box-shaped frame structure constructed for example of vertical tubular frame components 18, 20, 22, 24, and horizontal tubular frame components 26, 28, 30, 32, 34, 36 and 38. These tubular components may be welded or bolted together or secured in any other desired manner. Within the enclosure defined by the box-shaped frame is located a vertically adjustable carriage which may also be constructed in a box shape from tubular components including vertically disposed tubular components as 40, 42, 44 and 46, and horizontally disposed components 48, 50, 52, 54, 56, 58 and 60.

Figure 5:
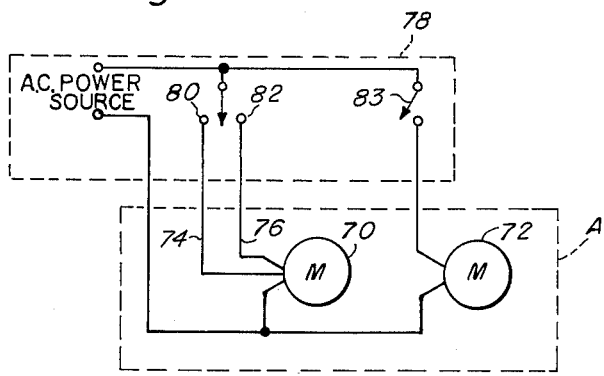
FIG. 5 is a diagrammatic view illustrating switch control means located in the cab of electrified railway vehicle for independently operating the dual power driving means.

Also secured between the horizontal components 52 and 54 as by welding or other means are support members 62 and 64, 66 and 68. The members 62 and 64 have received thereon a drive motor 70 which preferably may be reversible electrical motor. Similarly, the members 66 and 68 have received thereon a second motor 72 which may also be an elecrical motor. The dual drive means thus provided may be electrically connected as by cables 74 and 76 to a switch control panel mounted in a cab portion 78 of the vehicle 2 as indicated diagrammatically in FIG. 5. Switch means 80 and 82 enable an operator to operate the motor 70 and switch means 83 provides for operating motor 72 independently of motor 70.

Figure 2:
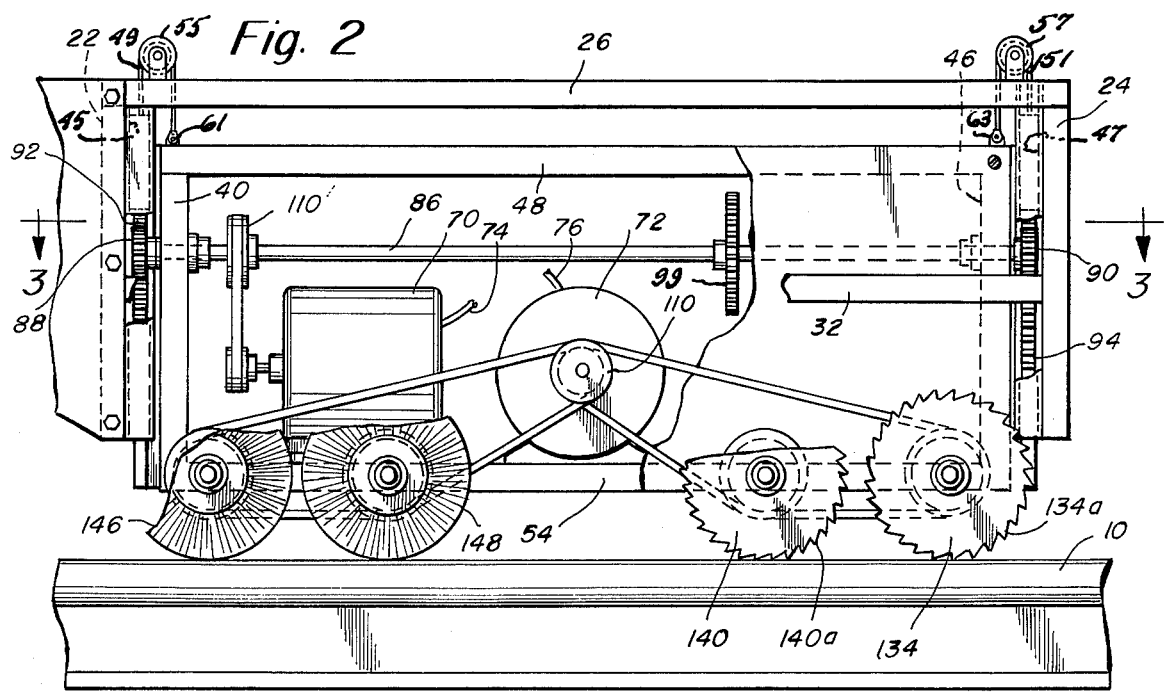
FIG. 2 is another side elevational view of the cleaner apparatus on a larger scale and indicating dual power driving means.
Figure 3:
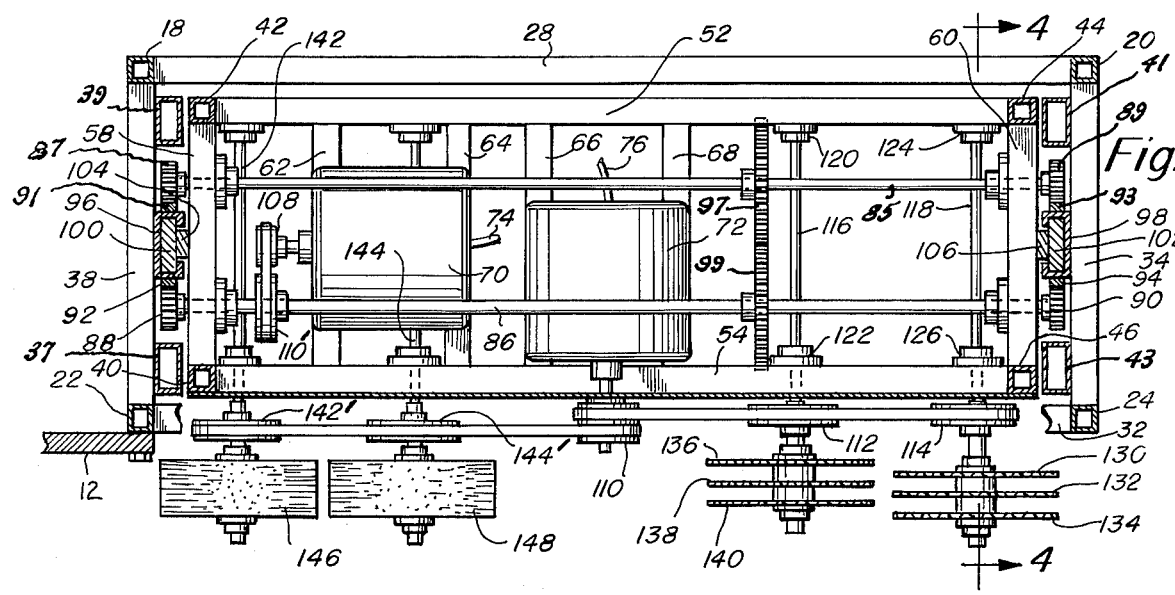
FIG. 3 is a cross section taken on the line 3—3 of FIG. 2.
Figure 4:
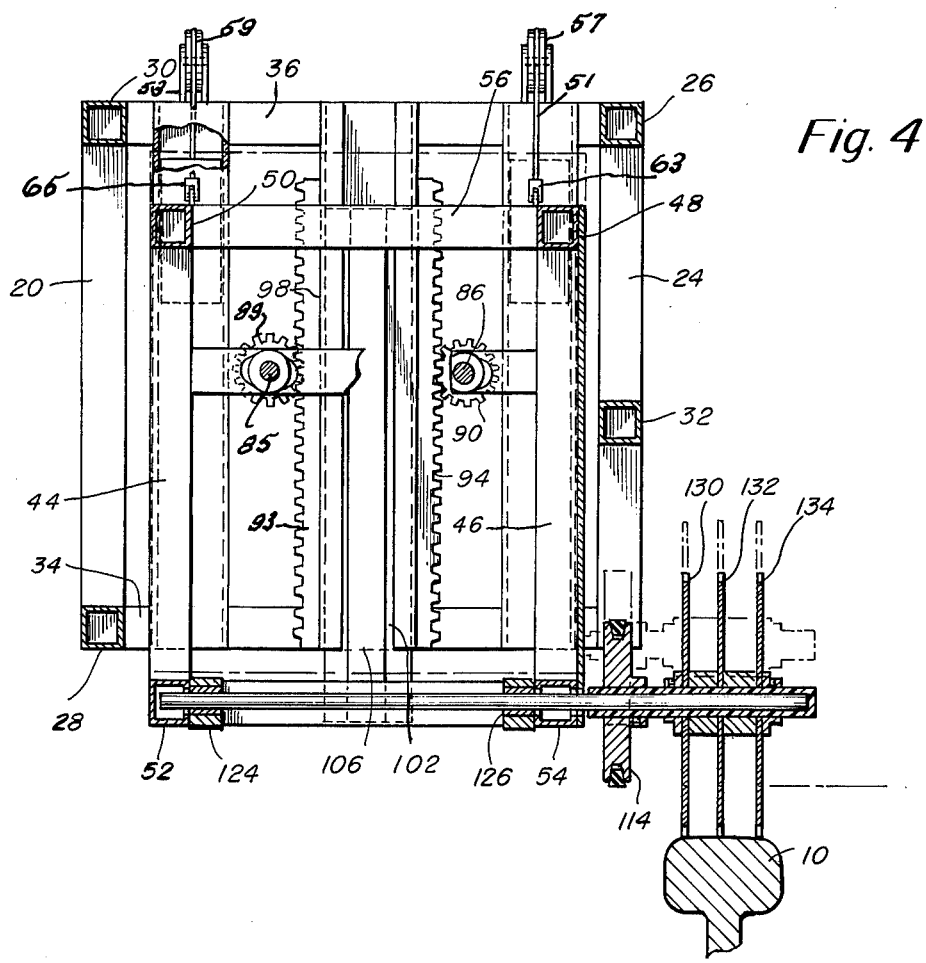
FIG. 4 is a cross section taken on the line 4—4 of FIG. 3.

As will be seen from an inspection of FIGS. 2 and 3, motor 70 is employed to provide for vertical adjustment of the carriage in the enclosure frame. This is accomplished by means of rack and gear means as shown in FIGS. 2, 3 and 4. A horizontally disposed shaft 86 has opposite ends thereof rotatably supported through components 58 and 60 of the carriage and fixed on projecting extremities of the shaft are gear members 88 and 90. These gears are arranged to mesh with respective vertical rack elements 92 and 94 rigidly fastened to upright channel members 96 and 98. The channel member 96 and 98 present vertical slideways in which are slideably contained slide elements 100 and 102 supported at opposite outer ends of the carriage on retainer bars 104 and 106.

There may also be provided in a preferred embodiment of the invention counterbalancing weight means for carrying out vertical travel of the carriage structure in a more smoothly guided manner. This may, for example, be accomplished by securing in the inner opposite ends of the box shaped frame components 34 and 38 vertically disposed tubular guides 37, 39, 41 and 43 most clearly shown in FIG. 3. Slideably disposed in these tubular guides are repective counterbalancing weight members, two of which are shown in FIG. 2 and noted by the numerals 45 and 47. At upper ends of each of the weights are attached suspension cords as 49, 51 and 53 which are received over respective pulleys as 55, 57, 59, and attached to retaining lugs as 61, 63, 65 fixed to upper frame components of the carriage as shown.

In combination with the counterbalancing weight means thus arranged at four inner corners of the frame, there is further provided a second drive shaft 85 which is located through the components 58 and 60 in a horizontally disposed position and in parallel spaced relation to the shaft 86 as indicated in FIG. 3. The opposite ends of the shaft 85 are gear members 87 and 89. These gears are arranged to mesh with additional vertical rack elements 91 and 93 solidly secured to channel members 96 and 98. Mounted on the second shaft 85 at an intermediate portion thereof is a reversing gear 97 which meshes with a gear 99 on shaft 86.

In operation, energizing motor 70 through switch controls 80, 82 actuates a pulley 108 belted to a pulley 110 on shaft 86 as is most clearly show in FIGS. 2 and 3. Rotation of shaft 86. thus induced causes the gears 88 and 90 to travel along respective racks 92 and 94. Also gear 99 drives gear 97, thus rotating shaft 85 and causing gears 87 and 89 to travel along rack elements 91 and 93 either up or down as required. During such vertical adjustment, the center balancing weights move up or down along guided paths of travel and lifting or lowering of the carriage is uniformly carried out by balanced forces acting on four corners of the carriage and less power may be utilized without jamming.

This vertical adjustment of the carriage is utilized to move the rotary cleaning means of the invention into and out of contact with the third rail 10. In the drawings, the cleaning means is shown in contact with the electrified third rail and in FIGS. 1 and 4 the cleaning means is shown in phantom lines in a raised position above the third rail 10. It will be noted that by means of the dual drive arrangement disclosed, the rotary cleaning elements may be independently activated at either before contact is made or at the time of engagement or after contact is carried out.

Considering this rotary cutter means in more detail, the motor 72 drives a double pulley 110 which is belted to spaced apart pulleys on 112 and 114 fixed on shafts 116 and 118 respectively. These shafts are mounted for rotation on bearings 120, 122, 124 and 126 in frame components of the carriage as shown in FIG. 3. At outer extremities of the shaft 116 and 118 are fixed two sets of cutter wheels denoted by numerals 130, 132, 134, 136, 138, 140. These cutter members are electrically nonconductive and are formed with cutter teeth 134a and 140a as best shown in FIG. 2. When these cutter wheels are rotated in a clockwise direction as viewed in FIG. 2, they function to cut into and break up sleet and ice accumulating on the third rail 10. Similarly shafts 142 and 144 have respective pulley members belted to pulley 110 as shown in FIG. 3 and at outer extremities of the shaft are fixed scouring brushes 146 and 148 which are arranged in tandem with the two sets of cutter wheels and in a position to be lowered into contact with the third rail 10 as suggested in FIG. 2. The scouring brushes 146 and 148 are also made of an electrically nonconductive material and it is contemplated that high abrasion resistant plastic materials may be utilized in forming the cutter teeth and the brushes. It is also pointed out that the cutter wheels of one set are offset with respect to cutter wheels of the second set, thus there is provided six separate paths along which cutting is carried out and, as will be noted in FIG. 4, the span of the cutter wheels corresponds substantially to the width of the third rail 10.

I claim:

1. Cleaning apparatus for removing ice and sleet from a third rail of an electrified railway vehicle, said apparatus comprising a frame, means for rigidly securing the frame to a wheel truck portion of the vehicle, a vertically adjustable carriage slideably disposed in the frame, rotatable cleaner means arranged at one side of the carriage, means for vertically adjusting the carriage in the frame and moving the rotatable cleaner means into and out of contact with the said third rail of the railway vehicle, and means for actuating the rotatable cleaner means when moved into engagement with the third rail.

2. The invention of claim 1 in which the means for vertically adjusting the carriage and the means for actuating the rotatable cleaner means are responsive to control means located in a cab portion of the said railway vehicle.

3. The invention of claim 1 in which the frame is provided at two opposite ends thereof with channeled members having vertical slideways formed therein and said carriage being formed at opposite outer ends with vertical slides engageable in the slideways.

4. The invention of claim 1 in which the frame is provided at two inner sides with channeled portions having vertical slideways formed therein, said carriage being formed at opposite outer ends with vertical slides engageable in the slideways, a shafthorizontally supported between the said inner sides of the frame and extending through the carriage, rack means vertically secured in opposite ends of the frame adjacent to the channeled portions, gear means fixed at opposite ends of the shaft to mesh with the rack means, power driving means mounted in the carriage for rotating the shaft and gear means and vertically adjusting the carriage in the frame along the said rack means.

5. The invention of claim 1 in which the frame is provided at two inner sides with channeled portions having vertical slideways formed therein, said carriage being formed at opposite outer ends with vertical slides engageable in the slideways, a shaft horizontally supported between the said inner sides of the frame and extending through the carriage, rack means vertically secured in opposite ends of the frame adjacent to the channeled portions, gear means fixed at opposite ends of the shaft to mesh with the rack means, power driving means mounted in the carriage for rotating the shaft and gear means and vertically adjusting the carriage in the frame along the said rack means, and said means for actuating the rotatable cleaner means including shaft means horizontally disposed in spaced apart relation in the carriage and independently operable power drive means mounted in the carriage for driving the shaft means.

6. The invention of claim 1 in which the frame is provided at two inner sides with channeled portions having vertical slideways formed therein, said carriage being formed at opposite outer ends with vertical slides engageable in the slideways, a shaft horizontally supported between the said inner sides of the frame and extending through the carriage, rack means vertically secured in opposite ends of the frame adjacent to the channeled portions, gear means fixed at opposite ends of the shaft to mesh with the rack means, power driving means mounted in the carriage for rotating the shaft and gear means and vertically adjusting the carriage in the frame along the said rack means, and said means for actuating the rotatable cleaner means includng shaft means horizontally disposed in spaced apart relation in the carriage and independently operable power drive means mounted in the carriage for driving the shaft means, and said rotatable cleaner means including spaced apart sets of electrically nonconductive rotary cutters and rearwardly disposed spaced apart electrically nonconductive scouring brush means.

7. The invention of claim 1 in which the means for vertically adjusting the carriage in the frame includes counterbalancing weights and tubular guides for receiving the weights at inner corners of the frame, said weights being attached to the carriage by cord elements and said cord elements being guided over pulley members fixed at upper corners of the frame.

* * * * *